United States Patent

[11] 3,525,300

| [72] | Inventor | Stanley V. Genetti<br>755 E. Broad St., Hazleton, Pennsylvania 18201 |
|---|---|---|
| [21] | Appl. No. | 815,624 |
| [22] | Filed | April 14, 1969 |
| [45] | Patented | Aug. 25, 1970 |

[54] APPARATUS FOR PREPARING FOOD
8 Claims, 5 Drawing Figs.

[52] U.S. Cl. .................................................. 99/427,
99/386, 99/391, 99/392, 99/393, 99/399, 99/443, 198/131
[51] Int. Cl. ........................................................ A47j 43/18
[50] Field of Search ........................................ 198/131;
126/41C; 99/386, 391, 393, 392, 399, 427, 443; 219/388

[56]  References Cited
UNITED STATES PATENTS

| 1,744,409 | 1/1930 | Morrisson | 99/391X |
| 2,264,611 | 12/1941 | Bemis | 99/393X |
| 2,517,360 | 8/1950 | Singer | 99/427X |
| 2,689,517 | 9/1954 | Angelus | 99/386X |
| 2,839,409 | 6/1958 | Matlen | 99/391X |
| 2,928,524 | 3/1960 | Jensen | 99/443UX |
| 3,087,418 | 4/1963 | Albright | 99/386X |

Primary Examiner— Billy J. Wilhite
Attorney—Jones and Lockwood

ABSTRACT: This disclosure relates to a food preparation apparatus for broiling both sides of a food product simultaneously. The apparatus includes a casing for enclosing an upper elongated continuous drive chain that carries a plurality of holders upon which food products are placed. A lower elongated drive chain which is parallel to but follows a path which is slightly longer and wider than that of the upper chain drive supports the bottom of the holders, disposing them at a predetermined angle so that food products will be properly exposed to a plurality of heating elements which have a variable temperature control. The heating elements are located on both sides of the elongated paths of the drive chains. A variable speed driving means controls the speed of the drive chains, whereby the drive chains travel at a predetermined speed through the heating elements for further control of the broiling process.

Patented Aug. 25, 1970  3,525,300

INVENTOR
STANLEY V. GENETTI
BY Beale and Jones
ATTORNEY

3,525,300

1
APPARATUS FOR PREPARING FOOD

BACKGROUND OF THE INVENTION

This invention relates to a food preparation apparatus and more particularly to a food broiler for broiling both sides of a food product simultaneously.

It has been proposed in the prior art to provide broilers for food products such as meats, fish, fowl, etc., which will allow the food product to be heated for a specific period of time. However, since variations in thickness, weight, and moisture content result in a lack of uniformity in the finished product, it is necessary to provide variable cooking temperature and cooking time periods in order to get an exact degree of completion for the many different kinds of food products desired to be prepared in the same apparatus.

Another problem encountered in using the present broilers is the positioning of the food products in relation to the heating elements. Many broilers merely suspend the food to be cooked, and the motion of the food carrier causes the food to swing toward and away from the heaters in an erratic way, thus producing uncertain results. Others fail to position the food for optimum exposure to the heater elements, and thus are inefficient. Numerous attempts have been made to produce a broiler which will solve these problems, and which will produce uniform, controlled cooking, but such prior attempts have led to more and more complex, and thus expensive devices and control systems, without really solving the problem.

SUMMARY OF THE INVENTION

It is, therefore, an object of this invention to provide a food broiler which will produce a uniformly finished product in spite of variations in thickness, weight, and moisture content, and will accomplish this efficiently, yet inexpensively.

It is a further object of the invention to provide a food broiler which will permit accurate and uniform cooking of a food product by providing a variable temperature control and a variable cooking time, whereby differences in food products can be compensated for by the broiler.

Another object of this invention is to provide a food broiler which will position the food product at the proper angle with respect to the heating elements thereby allowing the correct exposure of radiant heat to each surface of the food product.

Still another object of this invention is to provide an automatic pick-up device to remove the food product from the cooking position and store the same until it is used.

These and other objects that will become apparent from what follows are accomplished in the present invention through the use of a food broiler which is capable of cooking both sides of the product simultaneously, which positions the food at a proper angle with respect to the heating elements, and which provides accurate control of temperature and cooking time. The broiler of the present invention includes a casing, an upper elongated drive chain which is located within the casing, a plurality of food product holders which can be attached to the upper drive chain and a lower elongated drive chain for supporting and positioning the holders at an angle. A drive mechanism is provided for the upper and lower drive chains, and a pick-up mechanism removes the holders from the upper drive chain and stores them until the finished product is used. A plurality of heating elements are located within the casing on both sides of the paths patterned by the drive chains for providing radiant heat to both surfaces of the food product. A heating control means varies the radiant heat produced by the heating elements, and a speed control means regulates the speed of the drive chains, thereby varying the exposure time of the food product to the heating element.

BRIEF DESCRIPTION OF THE DRAWINGS

The foregoing and additional objects, features, and advantages of the invention will be apparent to those skilled in the art from the following detailed description of a preferred embodiment thereof, taken with the accompanying drawings, in which.

DESCRIPTION OF A PREFERRED EMBODIMENT

Figure 1:
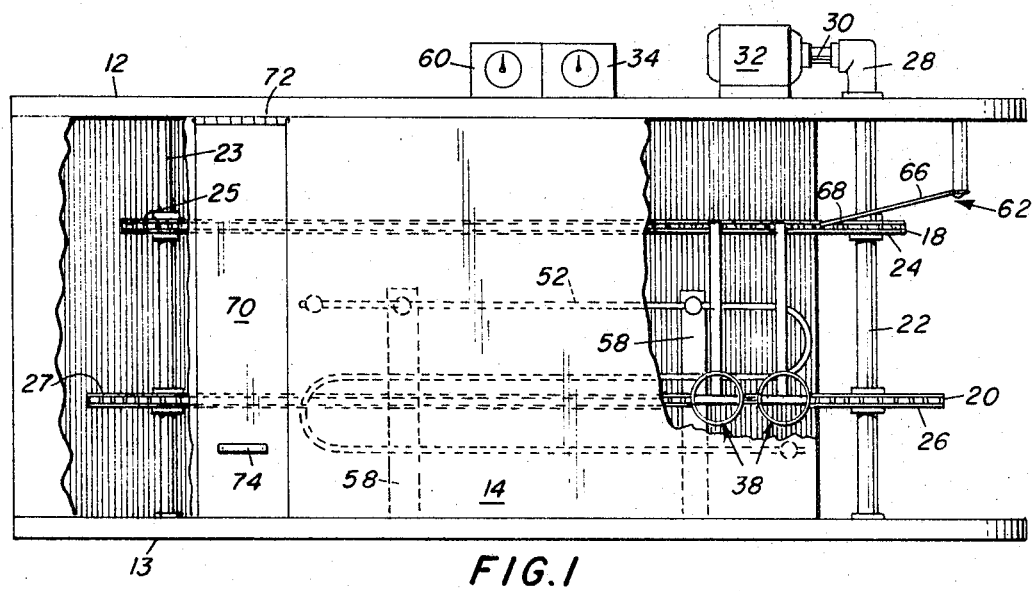
FIG. 1 is a side elevation view of a food broiler having two cut away portions showing the upper and lower drive chains according to my invention.
Figure 2:
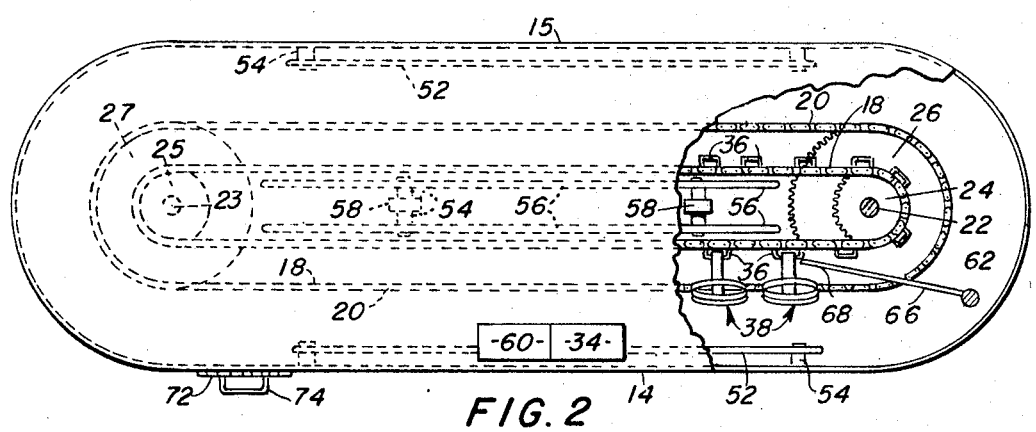
FIG. 2 is a top view of the food broiler of FIG. 1, having a portion of the top of the housing cut away to show the upper and lower drive chains.

Referring more particularly to the drawings, in FIG. 1 the numeral 10 indicates a food broiler which is housed in an elongated, generally oblong casing having semicircular ends, the casing being made up of a top plate 12, a bottom plate 13, side plates 14 and 15, and one end plate 16. The other end of the casing is open to facilitate access into the broiler.

The casing encloses upper and lower drive chains 18 and 20 respectively, which are supported for motion along, and which define, generally oblong, elongated parallel paths. A pair of support shafts 22 and 23 carry small upper sprockets 24 and 25, respectively for engaging and supporting the upper drive chain and carry large lower sprockets 26 and 27, respectively, for engaging and supporting the lower drive chain. The shafts are vertically disposed and journalled for rotation at the forward and rearward end of the casing, the rearward support shaft 23 being located near the closed end of the casing and the forward shaft 22 being located at the open end of the casing. A drive mechanism having a right angle gear box 28 secured to the forward support shaft at the top of the casing, with a drive shaft 30 connecting the gear box 28 and a driving means 32 such as an electric motor. The electric motor 32 drives the shaft 30 which transmits a rotating motion through the gear box 28 to the forward support shaft 22, thereby causing the upper and lower drive chains to move in their elongated paths. The path size is dictated by the size of the upper and lower sprockets and the distance between the vertical shafts. The speed of the motor 32 is controlled by a speed control means 34 of conventional type which is secured to the top plate 12.

Figure 4:
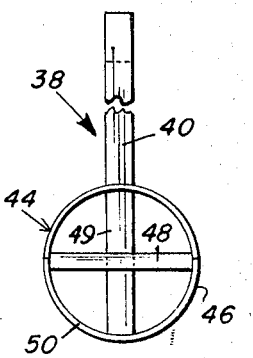
FIG. 4 is a front elevation of a food product holder according to my invention.
Figure 5:
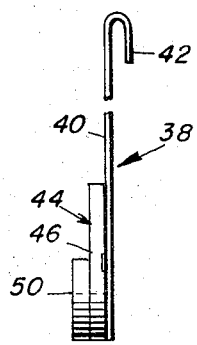
FIG. 5 is a side elevation of the food product holder of FIG. 4.

A plurality of lugs 36 are secured to the upper drive chain 18, and each lug is adapted to receive and carry a food holder 38. The holder 38 as shown in FIGS. 4 and 5, has a handle 40 with a hook portion 42 at the upper end and a grill portion 44 at the opposite end. The grill is shown in this preferred embodiment as a circular strip 46 with cross bars 48 and 49 secured within the circular strip, the lower portion of the circular strip 46 being of greater width (see FIG. 5) than the upper portion. This extra width provides an edge 50 which is sufficient to hold the food product on the grill portion when the holder is supported at an angle by the drive chains. If desired, additional fasteners may be provided to hold the food on the grill.

The holder 38 is supported and carried through the broiler by placing the hook 42 on one of the lugs 36 on the upper drive chain and resting the grill portion 44 on the lower drive chain 20 so that the holder will be held at a predetermined angle off the vertical.

Side heating elements 52, which may be comprised of any suitable heating coil, ribbon or other conventional element, are carried on insulators 54 which are secured on the inside of each side plate 14 and 15. Similarly, two center heating elements 56 of any suitable type are carried on insulators 54 secured to support members 58 (FIG. 3) disposed in the center of the casing within the elongated paths patterned by the drive chains 18 and 20. A temperature control means 60 which may be secured to the top plate 12 regulates the radiant heat which will be emitted from the heating coils during the cooking of a food product.

Figure 3:
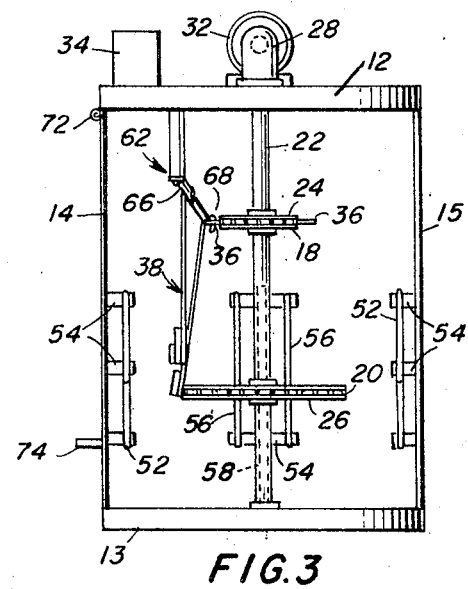
FIG. 3 is an end view of the food broiler of FIG. 1, taken on line 3—3.

A pick-up bar 62 secured to the under side of the top plate 12 has a vertical support bar 64 and a cantilever arm 66. The free end of the cantilever arm 66 is spaced slightly above and tangent to the periphery of the upper chain drive 18 so that it will engage the hooks 42 on the holders 38, as shown in FIG. 3, and thereby remove the holders from the drive chain 18, storing the holders 38 on the cantilever member 66 for subsequent removal from the broiler.

An access door 70 may be provided near the closed end of the casing to permit access to the rearward end of the broiler. The door is secured to the top plate 12 by a hinge 72, and includes a grip 74 whereby it may be pivoted upwardly, thereby allowing the food being prepared to be inspected or removed from the rear of the casing, if desired.

It can be seen from the above description and drawings that the food broiler provides a plurality of heating elements disposed in such a manner that both sides of the food product will be broiled simultaneously. In addition, the speed control and the radiant heat control permit both the cooking time and the cooking temperature to be varied, thus providing a wide latitude of control. Also, the proper position of the food product with respect to the heating elements is maintained by means of the lower drive chain, this lower chain preventing the holders from swinging toward and away from the heaters or from otherwise varying the distance between the heaters and the food to be cooked. Finally, the pick-up mechanism permits the food product to be removed from the cooking position and stored until it is used.

The specific parts of the described embodiment such as the heating elements, the drive chains, the driving means, and the holders can be varied and any commercially available substitute which will produce the desired results may be used. These type variations can be made in the invention as above described and illustrated without departing from the spirit and scope thereof as defined in the following claims.

I claim:

1. A food broiler for broiling both sides of a food product simultaneously comprising a casing having one closed end and one open end for access; an upper drive chain means disposed within said casing; holder means for carrying said food product; lug means secured to said upper drive means and adapted to receive and support said holder means; a lower drive chain means disposed within said casing for positioning said holder means at a predetermined angle; a pick-up means for removing said holder means from said upper drive chain means; a drive mechanism for driving said upper and lower chain drive means; radiant heating means for simultaneously exposing both sides of said holder means to radiant heat when said holder means are carried through said broiler by said drive chain means; speed control means for regulating the speed of said drive mechanism and heat control means for selecting the amount of radiant heat to be emitted from said radiant heating means, whereby food products on said holders are carried at a selected speed along a predetermined elongated path in said broiler past said radiant heating means for broiling of said food products.

2. The food broiler of claim 1, further including an access door near the closed end of said casing for permitting inspection and removal of said food products.

3. The food broiler of claim 1, wherein said upper drive chain means includes first and second support shafts, said first shaft being located near the closed end of the casing and said second shaft being located near the open end of said casing, an upper sprocket carried on each of said shafts and a chain extending between said shafts and engaging said sprockets to form an elongated path around said sprockets.

4. The food broiler of claim 3, wherein said lower drive chain means includes a lower sprocket carried on each of said first and second support shafts and spaced below said upper sprockets, and a chain extending between said shafts and engaging said lower sprockets to form an elongated path around said lower sprockets.

5. The food broiler of claim 3, wherein said drive mechanism includes a right angle gear box secured to the top of the casing for engaging said second shaft, and a motor means for engaging said right angle gear box thereby to drive said second shaft.

6. The food broiler of claim 4, wherein said radiant heating means includes heating coils located within and without the elongated paths formed by said upper and lower drive chains.

7. The food broiler of claim 6, wherein said pick-up means includes a cantilever arm secured near the open end of said casing, the free end of said cantilever arm being spaced slightly above and tangent to the upper sprocket, whereby said cantilever arm will engage holders carried by said lugs as said drive chain means are carried along their elongated paths by rotation of said second shaft.

8. The food broiler of claim 4, wherein said lower sprocket on each said support shaft is of greater diameter than the corresponding upper sprocket, whereby the path defined by said lower chain is wider and longer than the path defined by said upper chain, said lower chain engaging a lower part of said holders to support each holder at a predetermined angle off vertical.